(12) United States Patent
Akiyama

(10) Patent No.: US 7,973,825 B2
(45) Date of Patent: Jul. 5, 2011

(54) IMAGE SENSOR ARRAY ARCHITECTURE FOR IMPROVED RESOLUTION SWITCHING

(75) Inventor: Yutaka Akiyama, Kawasaki (JP)

(73) Assignee: Renesas Electronics Corporation, Kanagawa (JP)

( * ) Notice: Subject to any disclaimer, the term of this patent is extended or adjusted under 35 U.S.C. 154(b) by 398 days.

(21) Appl. No.: 12/135,619

(22) Filed: Jun. 9, 2008

(65) Prior Publication Data

US 2008/0303914 A1 Dec. 11, 2008

(30) Foreign Application Priority Data

Jun. 7, 2007 (JP) .................................. 2007-151278

(51) Int. Cl.
*H04N 5/228* (2006.01)
*H04N 3/14* (2006.01)
(52) U.S. Cl. ...................... 348/222.1; 348/294; 348/312
(58) Field of Classification Search .............. 348/211.11
See application file for complete search history.

(56) References Cited

U.S. PATENT DOCUMENTS 5,187,571 A * 2/1993 Braun et al. .................... 348/39
7,027,085 B2 * 4/2006 Watanabe ................. 348/218.1
2003/0117501 A1 * 6/2003 Shirakawa ................. 348/218.1
2005/0041123 A1 * 2/2005 Ansari et al. .................. 348/264
2008/0036875 A1 * 2/2008 Jones et al. ................ 348/222.1

FOREIGN PATENT DOCUMENTS

| JP | 11-234473 | 8/1999 |
| JP | 11-308409 | 11/1999 |
| JP | 2007-013741 | 1/2007 |

OTHER PUBLICATIONS

Japanese Official Action—2007-151278—Nov. 2, 2010.

* cited by examiner

*Primary Examiner* — Luong T Nguyen
(74) *Attorney, Agent, or Firm* — Young & Thompson

(57) ABSTRACT

An image sensor array is provided with: first and second CCD image sensors that output a plurality of first and second signal voltages from first and second output terminals, respectively; a switch circuit selectively connecting one of the first and second output terminals to a signal voltage output terminal; and a timing generator circuit responsive to a basic clock generating first and second control signals and switch control signals. First and second control signals control generation of the first and second signal voltages, respectively. The switch control signals are used for controlling the switch circuit. The timing generator circuit controls the first and second CCD image sensors so that the first and second CCD image sensors alternately output the first and second signal voltages. The timing generator circuit controls the switch circuit to alternately output from the signal voltage output terminal one of the first and second signal voltages.

13 Claims, 10 Drawing Sheets

IMAGE SENSOR ARRAY ARCHITECTURE FOR IMPROVED RESOLUTION SWITCHING

INCORPORATION BY REFERENCE

This application claims the benefit of priority based on Japanese Patent Application No. 2007-151278, filed on Jun. 7, 2007, the disclosure of which is incorporated herein by reference.

BACKGROUND OF THE INVENTION

1. Field of the Invention

The present invention relates to a CCD (charge coupled device) image sensor, more particularly, to a CCD image sensor adapted to resolution switching.

2. Description of the Related Art

Multi-function printers (MFP), which are complex machines having functions of an image scanner, a facsimile, a printer and so on, have become popular due to the technical advancement in recent years. In multi-function printers, the following two types of sensors have been put into practical use: an CCD image sensor adapted to optical image reduction with an optical lens; and a contact image sensor (CIS) comprising a contact rod lens and a color cell guide having a built-in LED emitting device, which is more cost-effective.

Various types of contact image sensors are known in the art. One example is a CMOS image senor array in which a plurality of CMOS image sensor chips are arranged and another example is a CCD image sensor array in which a plurality of CCD image sensors are arranged as disclosed in Japanese Laid-Open Patent Application No. JP-A Heisei 11-234473.

FIG. 1 is a block diagram illustrating the configuration of a prototype image sensor array provided with a pair of CCD image sensors, which has been developed by the inventor. The image sensor array shown in FIG. 1 is provided with first and second CCD image sensors 101 and 102, a timing generator 103, and a switch circuit 111.

The first and second CCD image sensors 101 and 102 are each provided with: a plurality of photodiodes for photoelectric conversion; memories temporarily holding electric charges received from the photodiodes; and a CCD shift register transferring the electric charges received from the memories to the output terminal. A first transfer gate is provided between the photodiodes and the memories, and a second transfer gate is provided between the memories and the CCD shift register.

The timing generator 103 has a function of supplying control signals (which may be referred to as clock pulses, hereinafter) required for driving these CCD image sensors. The timing generator 103 is connected to the first and second CCD image sensors 101 and 102, and supplies a first transfer gate signal ΦTG100 to the first and second CCD image sensors 101 and 102. The timing generator 103 also feeds control signals (referred to as the first CCD control signals 116, hereinafter) to the first CCD image sensor 101, including a first CCD second transfer gate signal ΦTG101, a first CCD non-inverted clock Φ101, a first CCD inverted clock Φ101B, a first CCD last gate pulse Φ101L, and a first CCD reset gate pulse Φ101R. In addition, the timing generator 103 feeds control signals (referred to as the second CCD control signals 117, hereinafter) to the second CCD image sensor 102, including a second CCD second transfer gate signal ΦTG102, a second CCD non-inverted clock Φ102, a second CCD inverted clock Φ102B, a second CCD last gate pulse Φ102L, and a second CCD reset gate pulse Φ102R.

The first transfer gate signal ΦTG100 is applied to the first transfer gates within the first and second CCD image sensors 101 and 102 to activate the first transfer gates at desired timings. The first CCD second transfer gate signal ΦTG101 is applied to the second transfer gate of the first CCD image sensor 101. The first CCD non-inverted clock Φ101 and the first CCD inverted clock Φ101B are applied to the CCD shift register of the first CCD image sensor 101. The first CCD last gate pulse Φ101L is applied to the final stage of the electric charge transfer channel of the first CCD image sensor 101. The first CCD reset gate pulse Φ101R is applied to a reset gate of the electric charge transfer channel of the first CCD image sensor 101. The second CCD second transfer gate signal ΦTG102 is applied to a second transfer gate of the second CCD image sensor 102. The second CCD non-inverted clock Φ102 and the second CCD inverted clock Φ102B are applied to an electric charge transfer channel of the second CCD image sensor 102. The second CCD last gate pulse Φ102L is applied to the final stage of the electric charge transfer channel of the second CCD image sensor 102. The second CCD reset gate pulse Φ102R is applied to a reset gate of the electric charge transfer part of the second CCD image sensor 102.

The first and second CCD control signals 116 and 117 are generated by the timing generator 103 and supplied to the first and second CCD image sensors 101 and 102, so that the output voltage signals of the first and second CCD image sensors 101 and 102 (which may be referred to as the first and second CCD output voltages $V_{OUT101}$, and $V_{OUT102}$, respectively) do not overlap each other in the time domain.

The switch circuit 111 has a function of selecting the output voltage signals supplied from the first and second CCD image sensors 101 and 102. The switch circuit 111 is connected to the first and second CCD image sensors 101 and 102. The switch circuit 111 is responsive to first and second switch timing control signals SW101 and SW102 received from the timing generator 103 for selecting one of the output signals from the first and second CCD image sensors 101 and 102. The selected output signal is outputted from the switch circuit 111 as a final output voltage 112.

FIG. 2 is a timing chart illustrating operation timings of the first and second CCD image sensors 101 and 102. The first and second CCD image sensors 101 and 102 have the same configuration, and the operation of the first CCD image sensor 101 is same as the operation of the second CCD image sensor 102. Therefore, a description is given in the following only of the first CCL image sensor 101.

FIG. 2 shows the waveforms of the first transfer gate signal ΦTG100, the first CCD second transfer gate signal ΦTG101, the first CCD non-inverted clock Φ101, the first CCD inverted clock Φ101B, the first CCD last gate pulse Φ101L, the first CCD reset gate pulse Φ101R, and the first CCD output voltage $V_{OUT101}$.

When externally receiving a light signal, the first CCD image sensor 101 provides photoelectric conversion by using PN junctions within the photodiodes of the first CCD image sensor 101 to thereby generate electric charge signals. At the time t01 when the accumulation of the electric charge signals is completed for one line, the first transfer gate signal ΦTG100 is pulled up to the high level to turn on the first transfer gate within the first CCD image sensor 101. At this time, electric charges are transferred from the photodiodes to the memory within the first CCD image sensor 101. At the time t02, the first transfer gate signal ΦTG100 is then pulled down to the low level to turn off the first transfer gate.

This is followed by switching the first CCD second transfer gate signal ΦTG101 from the low level to the high level at the time t03, allowing the electric charges accumulated in the respective memories of the first CCD image sensor 101 are transferred to the CCD shift register connected to the memories at the reading timings of the CCD image sensors.

At the time t04, the first CCD second transfer gate signal ΦTG101 is switched from the high level to the low level to complete the transfer of the electric charges from the memories to the CCD shift register. The CCD shift register is provided with electrodes which receives the first CCD non-inverted clock Φ101 and the first CCD inverted clock Φ101B, respectively. The first CCD non-inverted clock Φ101 and the first CCD inverted clock Φ101B are set to the high level and the low-level, respectively, and thereby the electric charges transferred to the CCD shift register are sequentially transferred to the last gate.

The first CCD last gate pulse Φ101L is fed to the last gate. At the time t05, the first CCD last gate pulse Φ101L is switched from the high level to the low level to allow the electric charges to be injected into a CFJ (Capacitor Floating Junction) provided at the subsequent stage of the last gate. The CFJ has a function of converting an electric charge signal into a voltage signal with a capacitive element. The accumulated electric charges are converted into the first CCD output voltage $V_{OUT101}$, by the CFJ, and the first CCD output voltage $V_{OUT101}$ is signal-amplified by an amplifier connected to the output of the CFJ.

A reset gate transistor is connected to the CFJ for initialization of the electric charges accumulated across the CFJ. The first CCD reset gate pulse Φ101R is fed to the gate terminal of the reset gate transistor. When the first CCD reset gate pulse Φ101R is switched from the low level to the high level, a VRD voltage of a predetermined voltage level (for example, 10V) is applied to the gate terminal to clear off the electric charges across the CFJ.

In the following, a description is given of the operation of the image sensor array, which incorporates the first and second CCD image sensors 101 and 102. FIG. 3 is a timing chart showing the operation of the image sensor array of FIG. 1. It should be noted that the first CCD control signals 116, including the first CCD second transfer gate signal ΦTG101, the first CCD non-inverted clock Φ101, the first CCD inverted clock Φ101B, the first CCD last gate pulse Φ101L, and the first CCD reset gate pulse Φ101R, are fed to the first CCD image sensor 101, while the second CCD control signals 117, including the second CCD second transfer gate signal (ΦTG102, the second CCD non-inverted clock Φ102, the second CCD inverted clock Φ102B, the second CCD last gate pulse Φ102L, and the second CCD reset gate pulse Φ102R, are fed to the second CCD image sensor 102.

The basic operation of the first and second CCD image sensors 101 and 102 is as described above. After the first and second CCD image sensors 101 and 102 receive light for a certain period of time, electric charges are accumulated across the photodiodes integrated therein. At the time t11, the first transfer gate signal ΦTG100 which is fed to both of the first and second CCD image sensors 101 and 102, is pulled up to the high level to thereby turn on the first transfer gates within the first and second CCD image sensors 101 and 102, simultaneously. As a result, the electric charges are transferred to the memories within each CCD image sensor in the period between the time t11 and the time t12.

This is followed by pulling up the first CCD second transfer gate signal ΦTG101 to the high level at the time t13, in order to output the electric charges accumulated in the memories of the first CCD image sensor 101 in first. The pull-up of the first CCD second transfer gate signal ΦTG101 allows the electric charges accumulated in the memories to be transferred to the CCD shift register in the first CCD image sensor 101.

At the time t14, the first switch timing control signal SW101 is switched to the high level to allow the switch circuit 111 to select the output of the first CCD image sensor 101, in order to output the pixel signal of the first CCD image sensor 101 in first. Thereafter, the first CCD control signals 116 are supplied to operate the first CCD image sensor 101, so that pixel signals are sequentially supplied from the first CCD image sensor 101 to the switch circuit 111. The switch circuit 111 outputs the final output voltage 112 in accordance with the pixel signals.

Next, the second CCD second transfer gate signal ΦTG102 is pulled up to the high level at time t15. The pull-up of the second CCD second transfer gate signal ΦTG102 allows the electric charges accumulated in the memories of the second CCD image sensor 102 to be transferred to the CCD shift register of the second CCD image sensor 102. At the time t16, the second switch timing control signal SW102 is then pulled up to the high level to allow reading the pixel signal of the second CCD image sensor 102, and the first switch timing control signal SW101 is pulled down to the low level. This allows the switch circuit 111 to select the pixel signals received from the second CCD image sensor 102. Thereafter, the second CCD control signals 117 are fed to operate the second CCD image sensor 102 so that the pixel signals are sequentially supplied from the second CCD image sensor 102 to the switch circuit 111. The switch circuit 111 outputs the final output voltage 112 in accordance with the pixel signals from the second CCD image sensor 102.

The image sensor array shown in FIG. 1 operates as thus described, outputting the pixel signals from the photodiodes integrated within the CCD image sensors.

CCD image sensors are often adapted to resolution switching. Typically, such a CCD image sensor is designed to operate in a low resolution mode in addition to the normal operation mode. In the following, an exemplary operation of the CCD image sensor for the low resolution mode will be described. Specifically, a description is given of a case when pixel signals from two pixels are added together to generate a resultant output signal in a read operation. Such operation may be also referred to as the multiple-pixel addition mode or referred to as the two-pixel addition mode for indicating that the number of relevant pixels is two. The person skilled in the art would recognize that the operation of the two-pixel addition mode results in the reduction in the resolution of the image sensor array down to half of the original resolution.

FIG. 4 is a timing chart showing operation timings of the first and second CCD image sensors 101 and 102 in the low resolution mode. As described above, the configuration and operation of the first and second CCD image sensors 101 and 102 are same. Therefore, the following description will be directed to the operation of the first CCD image sensor 101 in the low resolution mode.

FIG. 4 shows waveforms of the first transfer gate signal ΦTG100, the first CCD second transfer gate signal ΦTG101, the first CCD non-inverted clock Φ101, the first CCD inverted clock Φ101B the first CCD last gate pulse Φ101L, the first CCD reset gate pulse Φ101R. FIG. 4 also shows the amount of electric charges injected into the CFJ.

From the time t21 to t24, the operation in the two-pixel addition mode is same as the operation shown in FIG. 2. As shown in FIG. 4, cycle periods of the first CCD last gate pulse Φ101L and the first CCD reset gate pulse Φ101R are half of those of the first CCD non-inverted clock Φ101 and the first CCD inverted clock Φ101B. In this operation, electric charges of the two adjacent pixels are added together at the last gate. When a series of four photodiodes are used as first to fourth pixels of the CCD image sensor 101, for example, the electric charges of the first and second pixels, which are positioned adjacent to each other, are added together at the last gate, and the electric charges of the third and fourth pixels are added together at the last gate.

At the time t24, the second transfer gate signal ΦTG101 is switched from the high level to the low level. At the time t25, the first CCD non-inverted clock Φ101 is switched from the high level to the low level, and this allows the electric charges generated within the first pixel to be transferred from the CCD shift register to the last gate. At the time t25, the electric charges of the first pixel are accumulated at the last gate without being transferred to the CFJ, since the first CCD last gate pulse Φ101L is set to the high level. The first CCD non-inverted clock Φ101 is switched from the low level to the high level after the time t25, and then switched from the high level to the low level at the time t26. Similarly, the first CCD inverted clock Φ101B is switched from the high level to the low level after the time t25, and switched from the low level to the high level at the time t26.

At the time t26, the electric charges generated within the second pixel are transferred from the CCD shift register and to the last gate. This allows the electric charges of the first and second pixels to be added together at the last gate. Moreover, at the time t26, the first CCD last gate pulse Φ101L is switched from the high level to the low level to transfer the electric charges of the first and second pixels accumulated at the last gate to the CFJ. The electric charges obtained by adding together the electric charges of the first and second pixels are converted into a signal voltage by the CFJ, and the resultant signal voltage is outputted from the CFJ.

This is followed by pulling up the first CCD reset gate pulse Φ101R to the high level at the time t27 to initialize the CFJ. The first CCD last gate pulse Φ101L is also pulled up to the high level at the time t27.

Similar operation is then implemented for the third and fourth pixels. The first CCD last gate pulse Φ101L is kept at the high level from the time t27 to t29. In the meantime, the first CCD non-inverted clock Φ101 is switched from the low level to the high level and then to the low level. Similarly, the first CCD inverted clock Φ101B is switched from the high level to the low level and then to the high level. At the time t28, the electric charges generated within the third pixel are transferred to the last gate through the CCD shift register. Subsequently, the first CCD non-inverted clock Φ101 is switched from the low level to the high level and then to the low level, while the first CCD inverted clock Φ101B is switched from the high level to the low level and then to the high level. At the time t29, the electric charges generated within the fourth pixel is transferred to the last gate.

At the time t29, the first CCD non-inverted clock Φ101 is switched from the high level to the low level, and the first CCD last gate pulse Φ101L is switched from the high level to the low level. This results in that the electric charges of the third and fourth pixels are added together at the last gate, and the electric charges accumulated at the last gate are transferred to the CFJ. This completes the output of the pixel signals associated with the electric charges from the photodiodes within the CCD image sensor.

Hereinafter, a description is given of the overall operation of the image sensor array provided with the first and second CCD image sensors 101 and 102, when the image sensor array is placed into the two-pixel addition mode, which results in the reduction of the resolution down to one half.

FIG. 5 is a timing chart showing the operation of the image sensor array in the two-pixel addition mode. It should be noted that the first CCD control signals 116, including the first CCD second transfer gate signal ΦT101, the first CCD non-inverted clock Φ101, the first CCD inverted clock Φ101B, the first CCD last gate pulse ΦT101L, and the first CCD reset gate pulse Φ101R, are fed to the first CCD image sensor 101, while the second CCD control signals 117, including the second CCD second transfer gate signal ΦTG102, the second CCD non-inverted clock Φ102, the second CCD inverted clock Φ102B, the second CCD last gate pulse Φ102L, and the second CCD reset gate pulse Φ102R, are fed to the second CCD image sensor 102. The basic operation of the first and second CCD image sensors 101 and 102 is same as the operation described referring to FIG. 4.

At the time t31, the first switch timing control signal SW101 is switched to the high level to select the output of the first CCD image sensor 101. This allows outputting the pixel signals of the first CCD image sensor 101 in first. In the meantime, electric charges generated within the photodiodes are transferred to the memories before the time t32 within each of the CCD image sensors 101 and 102.

The electric charges accumulated in the memories are transferred to the CCD shift register within the first CCD image sensor 101 in response to the first CCD second transfer gate signal ΦTG101. The first CCD control signals 116 are fed to the first CCD image sensor 101 so as to operate the first CCD image sensor 101 in the two-pixel addition mode (in which the resolution is reduced to one half), and signal voltages are sequentially outputted from the first CCD image sensor 101 with the electric charges of two adjacent pixels added together.

This is followed by pulling up the second switch timing control signal SW102 to the high level to select the second CCD image sensor 102, while the first switch timing control signal SW101 is pulled down to the low level This allows outputting the pixel signals of the second CCD image sensor 102 from the switch circuit 111. Before that, the second CCD second transfer gate signal ΦTG102 is switched to the high level to transfer the electric charges from the memories to the CCD shift register within the second CCD image sensor 102.

Thereafter, the second CCD control signals 117 are fed to the second CCD image sensor 102 so that the second CCD image sensor 102 operates in the two-pixel addition mode (in which the resolution is reduced to one half), and signal voltages are sequentially outputted from the second CCD image sensor 102 with the electric charges of two adjacent pixels added together.

One requirement of a CCD image sensor array is the reduction of the image reading time. The inventor has discovered that there is a room for reducing the image reading time in operating the image sensor array in the low resolution mode. In the above-described operation of the prototype CCD image sensor array, the image reading time in reading pixel signals with a normal resolution (or a high resolution) is same as that in reading pixel signals with a low resolution (or a multiple-pixel addition mode). The reading speed or charge transfer speed of a CCD image sensor is determined by the speed of transferring electric charges over the CCD shift register. Therefore, the CCD image sensor array suffers from a difficulty in enhancing the image reading speed over the maximum transfer speed of the CCD shift register, even when the image sensor array is operated in a multiple-pixel addition mode with a low resolution), This may result in that the user feels that the reading speed is slow when the image sensor array is placed into the multiple-pixel addition mode (with a low resolution). This is a problem to be avoided for both a customer who uses a scanner and a company which manufactures the scanner by using a contact image sensor device.

One may consider that the image reading time is sufficiently short when an image scanner is operated in a preview mode or the like; however, the reduction of the image reading time in a preview mode is actually achieved by omission of reading pixel signals for some pixels. The omission of reading pixel signals for some pixels allows reducing the image data conversion time and the image data transfer time. Further, the read operation from the pixels in the sub-scanning direction is not done for all of the lines of the CCD image sensor; the read operation is only performed for every multiple lines.

One potential approach to solve this problem may be to increase the charge transfer speed of the CCD shift register. For example, Japanese Laid-Open Patent Application No. JP-A Heisei 11-308409 discloses that the cycle period of the charge transfer clock is increased up to double of the normal operation mode, when the CCD image sensor chip is operated with a half resolution mode. However, the skilled person would appreciate the technical difficulty in increasing the charge transfer speed. The maximum charge transfer speed of the CCD shift register is determined by the voltage waveform of the non-inverted clock and the inverted clock supplied to the CCD shift register and by the dose amount of ions injected into the CCD shift register. Typically, signal levels of the non-inverted and inverted clocks fed to the CCD shift register are fixed to 5V or 3.3V. The signal levels of the non-inverted and inverted clocks determine the maximum operation speed and transferable electric charge amount of the CCD shift register.

One potential approach for enhancing the operation speed of the CCD shift register is to shallow the potential of the CCD shift register by reducing the dose amount of ions injected into the CCD shift register. However, the reliable operation of the CCD shift register requires a certain amount of electric charges enough to develop a pixel signal with a voltage level of 1 to 2V or more. Therefore, it is not preferable to excessively reduce the dose amount of ions injected into the CCD shift register. Another potential approach may be to shallow the potential of the CCD shift register with the width thereof increased in order to increase the volume of electric charges stored in the CCD shift register. However, this approach undesirably increases the chip size, causing the cost increase of the CCD image sensors.

SUMMARY

In an aspect of the present invention, an image sensor array is provided with: a first CCD image sensor configured to output a plurality of first signal voltages from a first output terminal; a second CCD image sensor configured to output a plurality of second signal voltages from a second output terminal; a switch circuit selectively connecting one of the first and second output terminals to a signal voltage output terminal; and a timing generator circuit responsive to a basic clock for generating first and second control signals and switch control signals. The first and second control signals are used for controlling generation of the plurality of first and second signal voltages, respectively. The switch control signals are used for controlling the switch circuit. The timing generator circuit controls the first and second CCD image sensors so that the first and second CCD image sensors output the plurality of first signal voltages and the plurality of second signal voltages, alternately. The timing generator circuit controls the switch circuit so that switch circuit outputs from the signal voltage output terminal the plurality of first signal voltages and the plurality of second signal voltages, alternately.

BRIEF DESCRIPTION OF THE DRAWINGS

The above and other objects, advantages and features of the present invention will be more apparent from the following description of certain preferred embodiments taken in conjunction with the accompanying drawings, in which.

DESCRIPTION OF THE PREFERRED EMBODIMENTS

The invention will now be described herein with reference to illustrative embodiments. Those skilled in the art will recognize that many alternative embodiments can be accomplished using the teachings of the present invention and that the invention is not limited to the embodiments illustrated for explanatory purposes.

First Embodiment

Hereinafter, embodiments of the present invention will be described, referring to the accompanying drawings. In embodiments below, a description is given with an assumption that a CCD image sensor array of the present invention is incorporated within a contact image sensor device; however, this does not mean that the present invention is applied only to contact image sensors.

Figure 6:
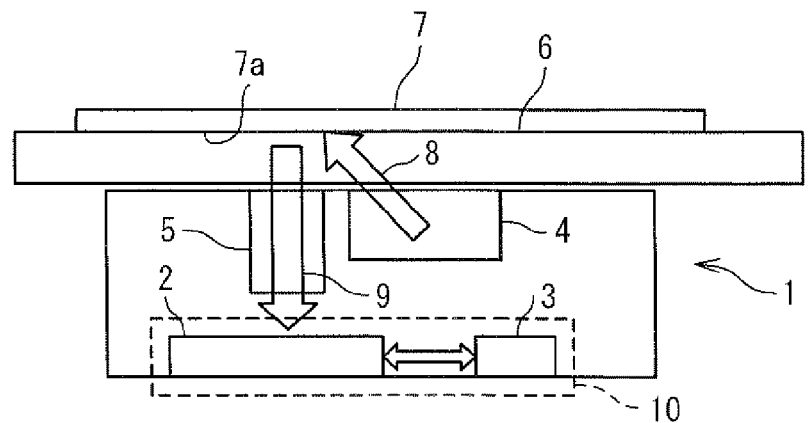
FIG. 6 is a block diagram illustrating a configuration of a contact image sensor of a first embodiment.

FIG. 6 is a block diagram illustrating the configuration of a contact image sensor device 1 in a first embodiment of the present invention. Referring to FIG. 6, the contact image sensor device 1 is provided with an image sensor unit 10, a color cell guide 4, and a contact rod lens 5. A glass plate 6 is provided on the top of the contact image sensor device 1. A target document 7 is placed on the glass plate 6. The contact image sensor device 1 is driven to travel in a vertical direction of the document 7 in order to read the image and/or text on the document 7.

The color cell guide 4 incorporates LED light sources which emit red, blue, and green lights. The lights emitted by the LED light sources travels across the color cell guide 4 to generate illumination light 8. The generated illumination light 8 is evenly exposed to the document surface 7a. The document surface 7a reflects the illumination light 8 to generate reflected light 9 which contains color information of the document 7. The reflected light 9 enters the contact rod lens 5 through the glass plate 6, and then enters the CCD image sensor array 2 located under the contact rod lens 5.

The light incident on the CCD image sensor array 2 is photoelectrically converted into electric signals (or color signals) by photodiodes within the CCD image sensor array 2. The color signals generated by the contact image sensor device 1 are transmitted to an A/D (analog/digital) converter integrated within an image scanner or the like, and are converted into digital signals that can be handled by computers.

Figure 7:
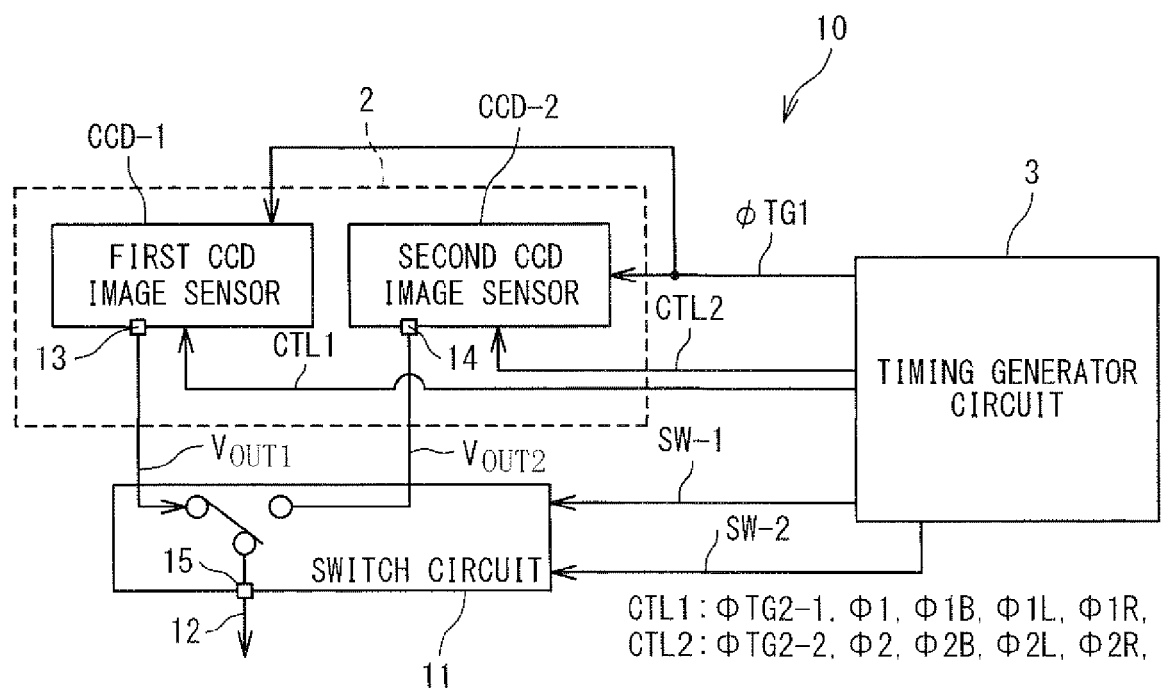
FIG. 7 is a block diagram illustrating a configuration of a CCD image sensor array of the first embodiment.

Referring again to FIG. 7, the image sensor unit 10 includes a CCD image sensor array 2, a timing generator circuit 3, and a switch circuit 11. The CCD image sensor array 2 includes first and second CCD image sensors CCD-1 and CCD-2, which are both connected to the timing generator circuit 3.

The timing generator circuit 3 controls the operation timings of the CCD image sensors CCD-1 and CCD-2. More specifically, the timing generator circuit 3 feeds a first transfer gate signal $\Phi TG1$ to both the first and second CCD image sensors CCD-1 and CCD-2. Moreover, the timing generator circuit 3 feeds first control signals CTL1 to the first CCD image sensor CCD-1, and feeds second control signals CTL2 to the second CCD image sensor CCD-2. In this embodiment, the first control signals CTL1 includes a first CCD second transfer gate signal $\Phi TG2-1$, a first CCD non-inverted clock $\Phi 1$, a first CCD inverted clock $\Phi 1B$, a first CCD last gate pulse $\Phi 1L$, and a first CCD reset gate pulse $\Phi 101R$. Correspondingly, the second control signals CTL2 includes a second CCD second transfer gate signal $\Phi TG2-2$, a second CCD non-inverted clock $\Phi 2$, a second CCD inverted clock $\Phi 2B$, a second CCD last gate pulse $\Phi 2L$, and a second CCD reset gate pulse $\Phi 2R$. The first and second CCD last gate pulses $\Phi 1L$ and $\Phi 2L$ are low-active signals, while the first and second CCD reset gate pulses $\Phi 1R$ and $\Phi 2R$ are high-active signals, in this embodiment.

The first CCD image sensor CCD-1 has an output terminal 13 connected to the switch circuit 11. Similarly, the second CCD image sensor CCD-2 has an output terminal 14 connected to the switch circuit 11. The switch circuit 11 receives signal voltages $V_{OUT1}$ and $V_{OUT2}$ respectively outputted from the first and second CCD image sensors CCD-1 and CCD-2, and selects one of the signal voltages $V_{OUT1}$ and $V_{OUT2}$. The switch circuit 11 outputs the selected signal voltage from a resultant signal voltage output terminal 15. The switch circuit 11 is responsive to first and second switch control signals SW-1 and SW-2 received from the timing generator circuit 3 for selecting the signal voltages $V_{OUT1}$ and $V_{OUT2}$ received from the CCD image sensors CCD-1 and CCD-2.

Hereinafter, a description is given of the configuration of the first and second CCD image sensors CCD-1 and CCD-2. In the present embodiment, the configuration of the first CCD image sensors CCD-1 is same as that of the second CCD image sensors CCD-2, except for that the second CCD image sensors CCD-2 receives the control signals CTL2 in place of the control signals CTL1 Therefore, the description below mainly refers to the first CCD image sensors CCD-1.

Figure 8:
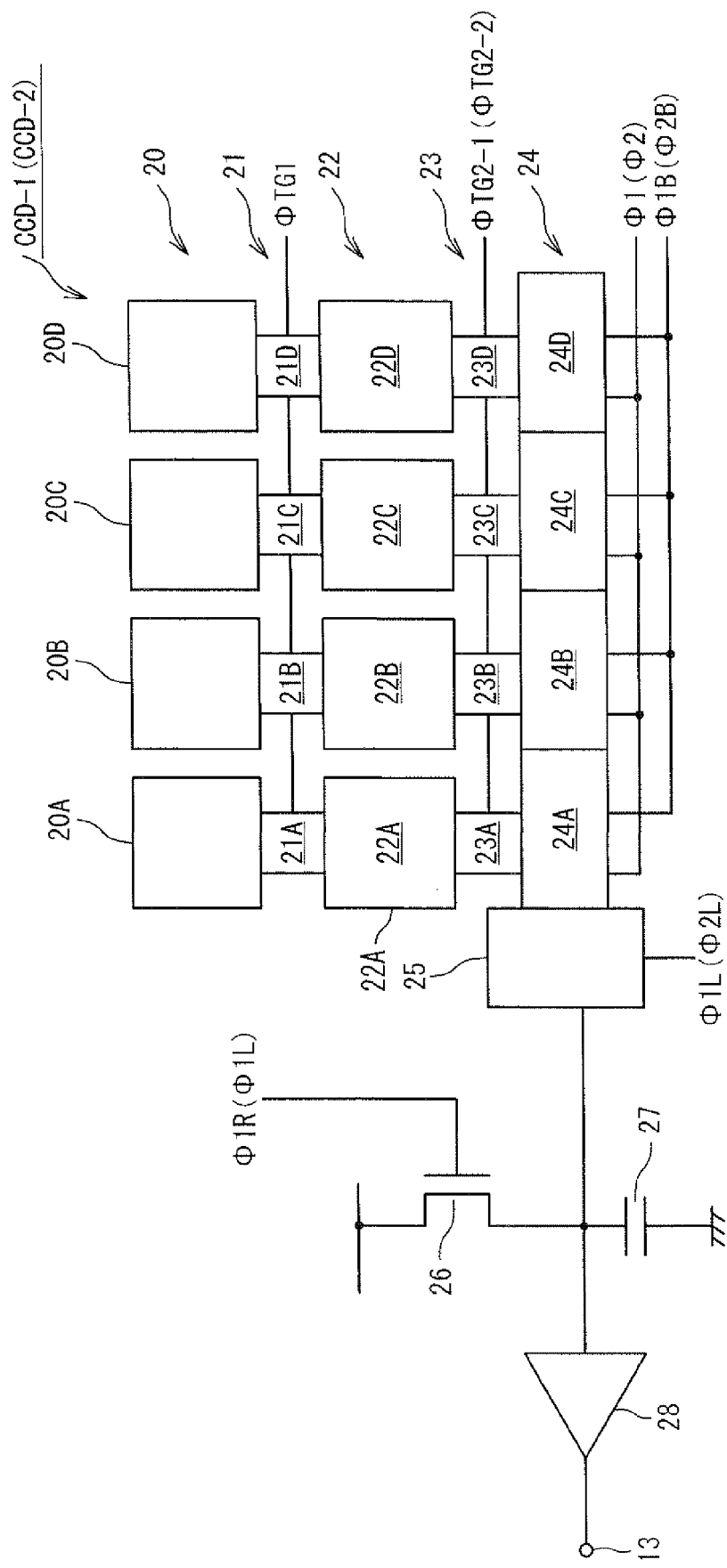
FIG. 8 is a block diagram illustrating a configuration of a CCD image sensor of the image sensor array of the first embodiment.

FIG. 8 is a block diagram illustrating the configuration of the first CCD image sensor CCD-1 (and the second CCD image sensor CCD-2). The first CCD image sensor CCD-1 is provided with: a photodiode array 20, a first transfer gate array 21, a memory array 22, a second transfer gate array 23, a CCD shift register 24, a last gate 25, a reset gate transistor 26, a CFJ (Capacitor Floating Junction) 27, and an amplifier 28.

The photo diode array 20A comprises a plurality of photodiodes arranged laterally. For simplicity, it is assumed that four photodiodes (first to fourth pixel photodiodes 20A to 20D) are provided within the first CCD image sensor CCD-1 (and the second CCD image sensor CCD-2) in this embodiment; however, the skilled person would appreciate that the number of the photodiodes within the CCD image sensors CCD-1 and CCD-2 is not limited to four.

The first transfer gate array 21 comprises transfer gates 21A to 21D which transfer electric charges from the pixel photodiodes 20A to 20D to the memory array 22, respectively. The transfer gates 21A to 21D are responsive to the first transfer gate signal $\Phi TG1$ for transferring the electric charges to the memory array 22.

The memory array 22 comprises a plurality of memories, referred to as first to fourth pixel memories 22A to 22D, which temporarily store electric charges received from the photodiodes 20A to 20D, respectively.

The second transfer gate array 23 is comprises transfer gates 23A to 23D which transfer electric charges from the first to fourth pixel memories 22A to 22D to the CCD shift register 24. The transfer gates 23A to 23D are responsive to the first CCD second transfer gate signal $\Phi TG2-1$ for transferring the electric charges to the memory array 22.

The CCD shift register 24 transfer electrical charges received from the first to fourth pixel memories 22A to 22D to the last gate 25, which is connected to the output of the CCD shift register 24. The CCD shift register 24 comprises serially-connected charge shift elements 24A to 24D which are connected with the pixel memories 22A to 22D, respectively. Each of the charge shift elements 24A to 24D of the CCD shift registers 24 is provided with a pair of electrodes receiving the first CCD non-inverted clock $\Phi 1$ and the first CCD inverted clock $\Phi 1B$, respectively.

The last gate 25 transfers the electric charges from the CCD shift register 24 to the CFJ 27 in response to the first CCD last gate pulse $\Phi 1L$. The CFJ 27 is a capacitive element which converts the electric charge signal received from the last gate 25 into a voltage signal. The reset gate transistor 26 is connected to the CFJ 27 to initialize the CEJ 27. The reset gate transistor 26 receives the first CCD reset gate pulse $\Phi 1R$ on the gate thereof and resets the CFJ 27 to a predetermined reset voltage in response to the first CCD reset gate pulse $\Phi 1R$. The CFJ 27 is also connected to the amplifier 28 which amplifies the voltage signal obtained by the CFJ 27.

The first CCD image sensor CCD-1 operates as follows: When light enters the photodiode array 20, the photodiode array 20 provides photoelectrical conversion by using PN junctions to accumulate electric charge signals across the photodiodes. When the accumulation of the electric charge signals completes for one line, the first transfer gate array 21 is turned on to transfer the electric charges to the respective memories 22A, 22B, 22C, and 22D connected to the four photodiodes 20A, 20B, 20C, and 20D. After the completion of the electric charge transfer, the first transfer gate array 21 is turned off.

The electric charges accumulated in the respective memories 22A, 22B, 22C, and 22D are transferred to the corresponding charge transfer elements 24A, 24B, 24C, and 24D of the CCD shift register 35 at the read timing of the respective CCD image sensors. This is followed by alternately switching the first CCD non-inverted clock $\Phi 1$ and the first CCD inverted clock $\Phi 1B$ between the high level and the low level, and thereby transferring the electric charges over the CCD shift register 24 from the charge transfer element 24D, to the charge transfer element 24C, to the charge transfer element 24B, to the charge transfer element 24A, and then to the last gate 25.

When the first CCD last gate pulse OIL is switched from the high level to the low level, the electric charges are injected into the CFJ 27. The CFJ 27 converts the electric charge signal received from the last gate 25 into a voltage signal, and the voltage signal is amplified by the amplifier 28. This allows outputting the signal voltage $V_{OUT1}$ from the first CCD image sensor CCD-1. When the first CCD reset pulse Φ1R is then switched from the low level to the high level, a VRD voltage of a predetermined voltage level (for example, 10V) is applied to the CFJ 27 so that the electric charges across the CFJ 27 are cleared.

The second CCD image sensor CCD-2 is structured and operated identically, except for receiving the second CCD second transfer gate signal ΦTG2-2, the second CCD non-inverted clock Φ2 and the second CCD inverted clock Φ2B, the second CCD last gate pulse Φ2L, and the second CCD reset gate pulse Φ2R in place of the first CCD second transfer gate signal ΦTG2-1, the first CCD non-inverted clock Φ1 and the first CCD inverted clock Φ1B, the first CCD last gate pulse Φ1L, and the first CCD reset gate pulse Φ1R.

Figure 1:
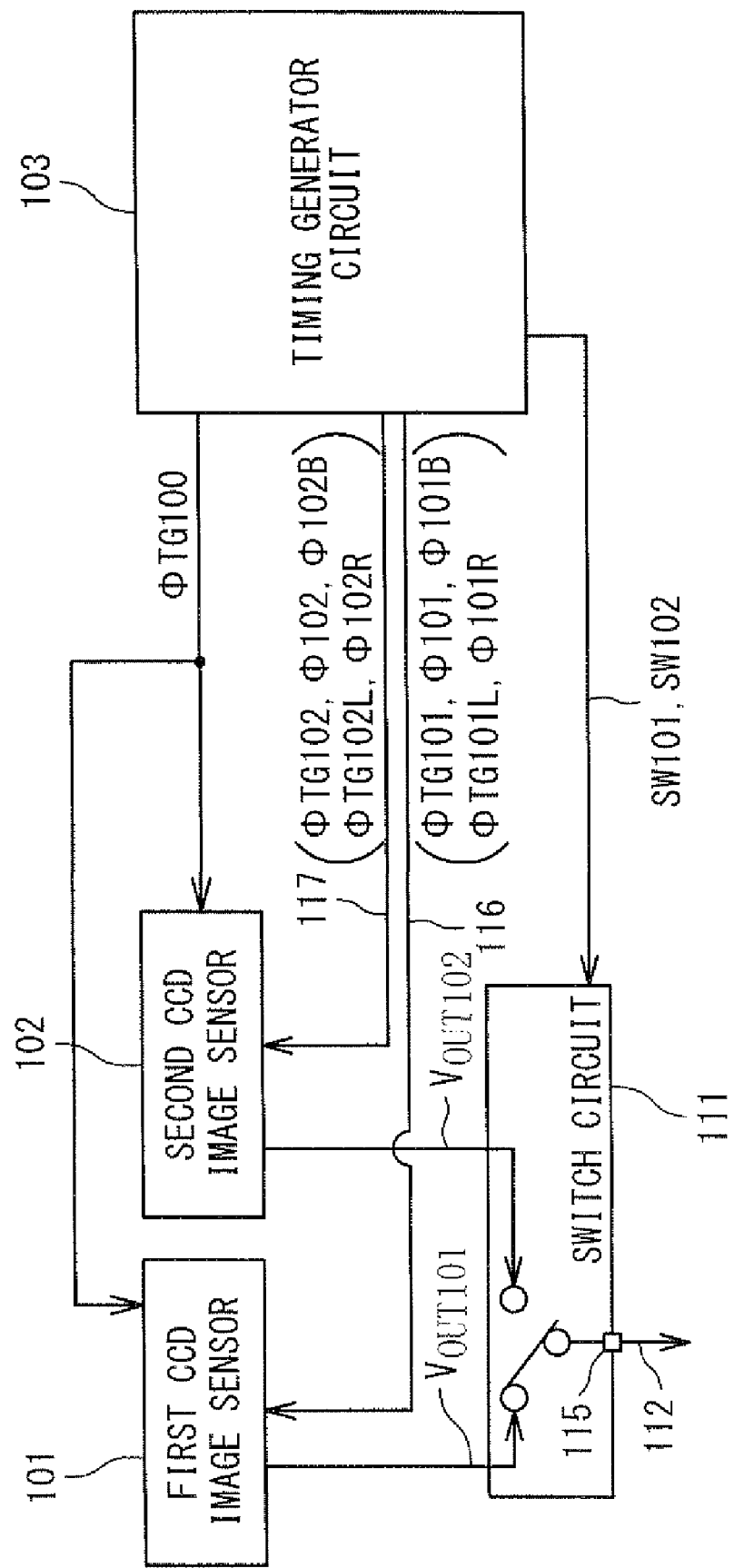
FIG. 1 is a block diagram showing a configuration of a prototype CCD image sensor array.
Figure 2:
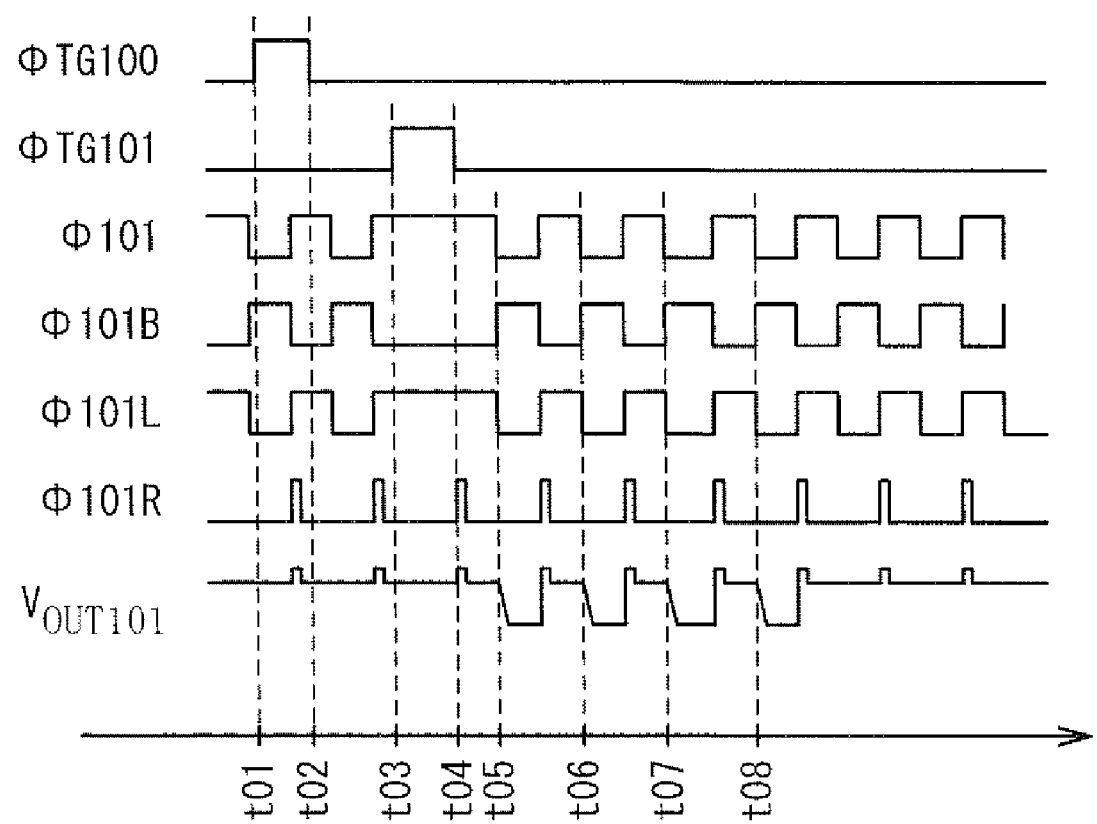
FIG. 2 is a timing chart showing a basic operation of a CCD image sensor within the prototype CCD image sensor array shown in FIG. 1.
Figure 3:
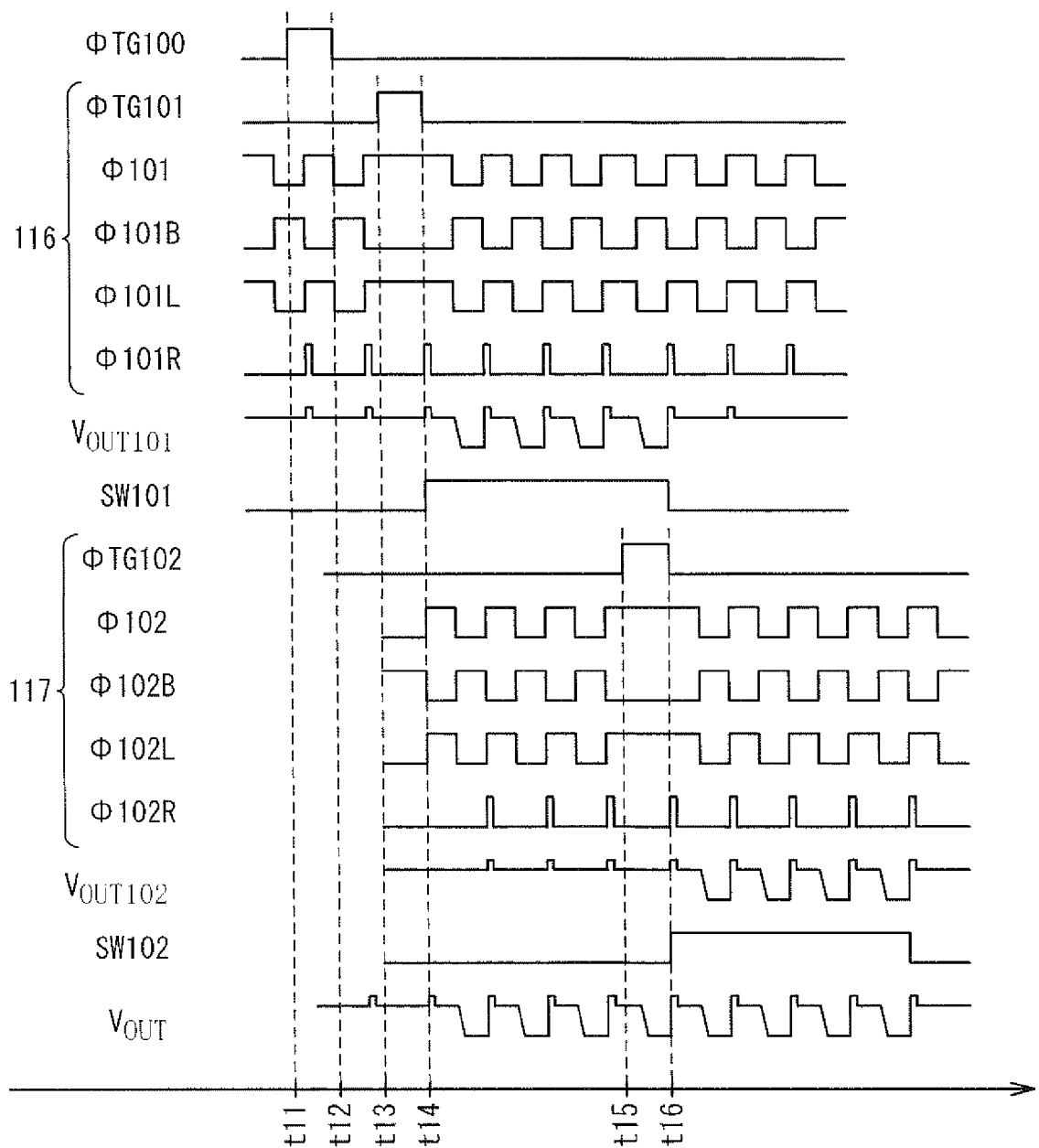
FIG. 3 is a timing chart showing the operation of the prototype CCD image sensor array shown in FIG. 1.
Figure 4:
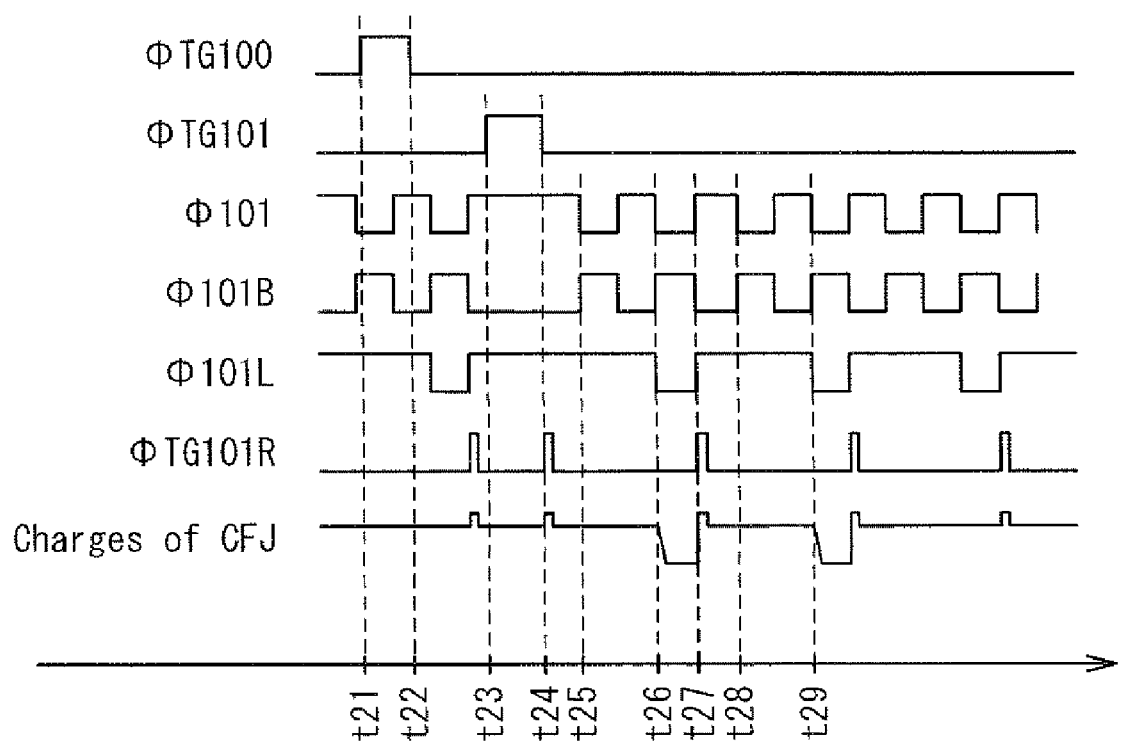
FIG. 4 is a timing chart showing the operation of the CCD image sensor when the CCD image sensor is operated so that the resolution thereof is reduced down to one half of the original resolution (the operation of two-pixel addition mode)
Figure 5:
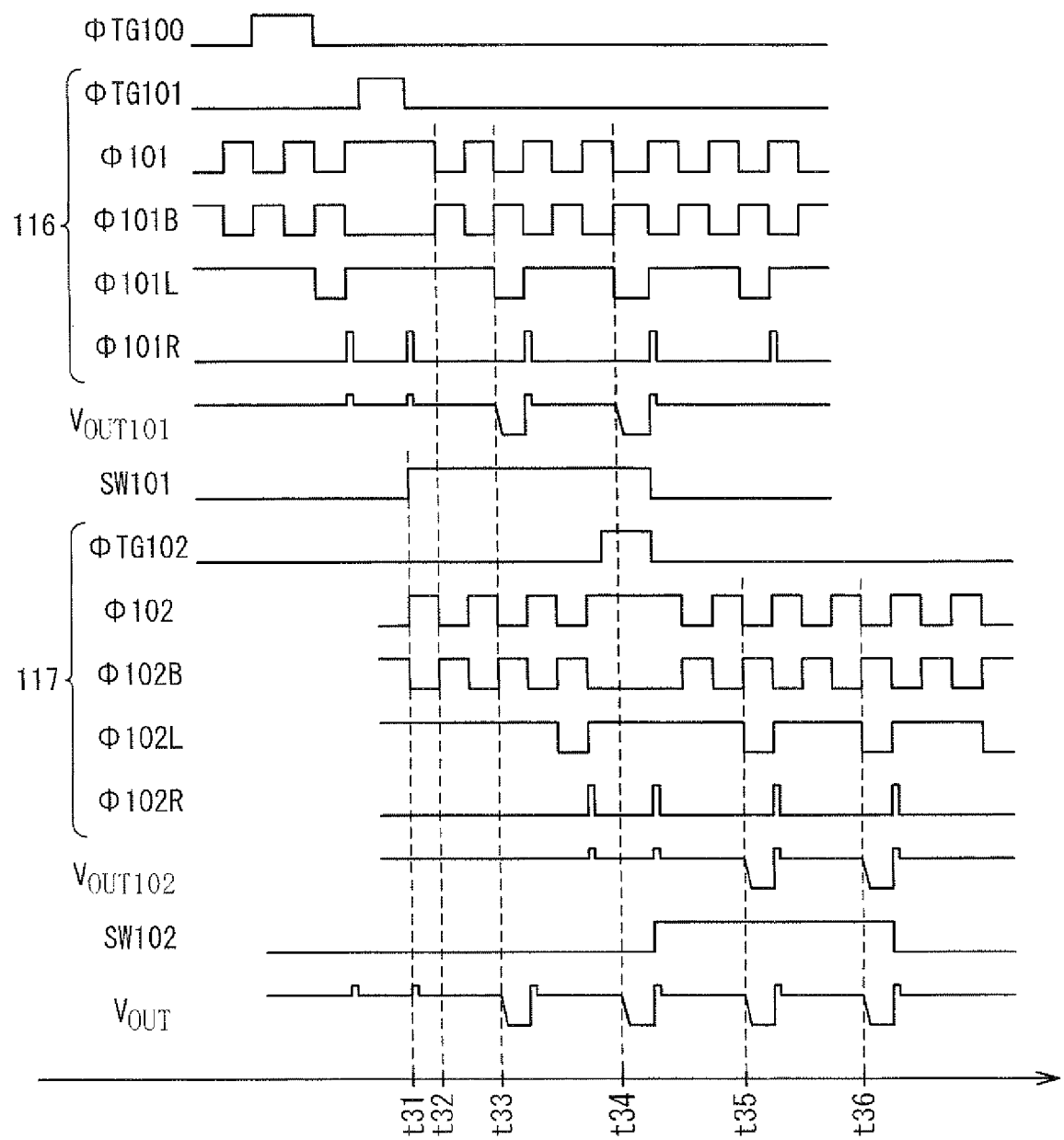
FIG. 5 is a timing chart showing the overall operation of the image sensor array when the image sensor array is operated so that the resolution thereof is reduced down to one half of the original resolution (the operation of two-pixel addition mode)
Figure 9:
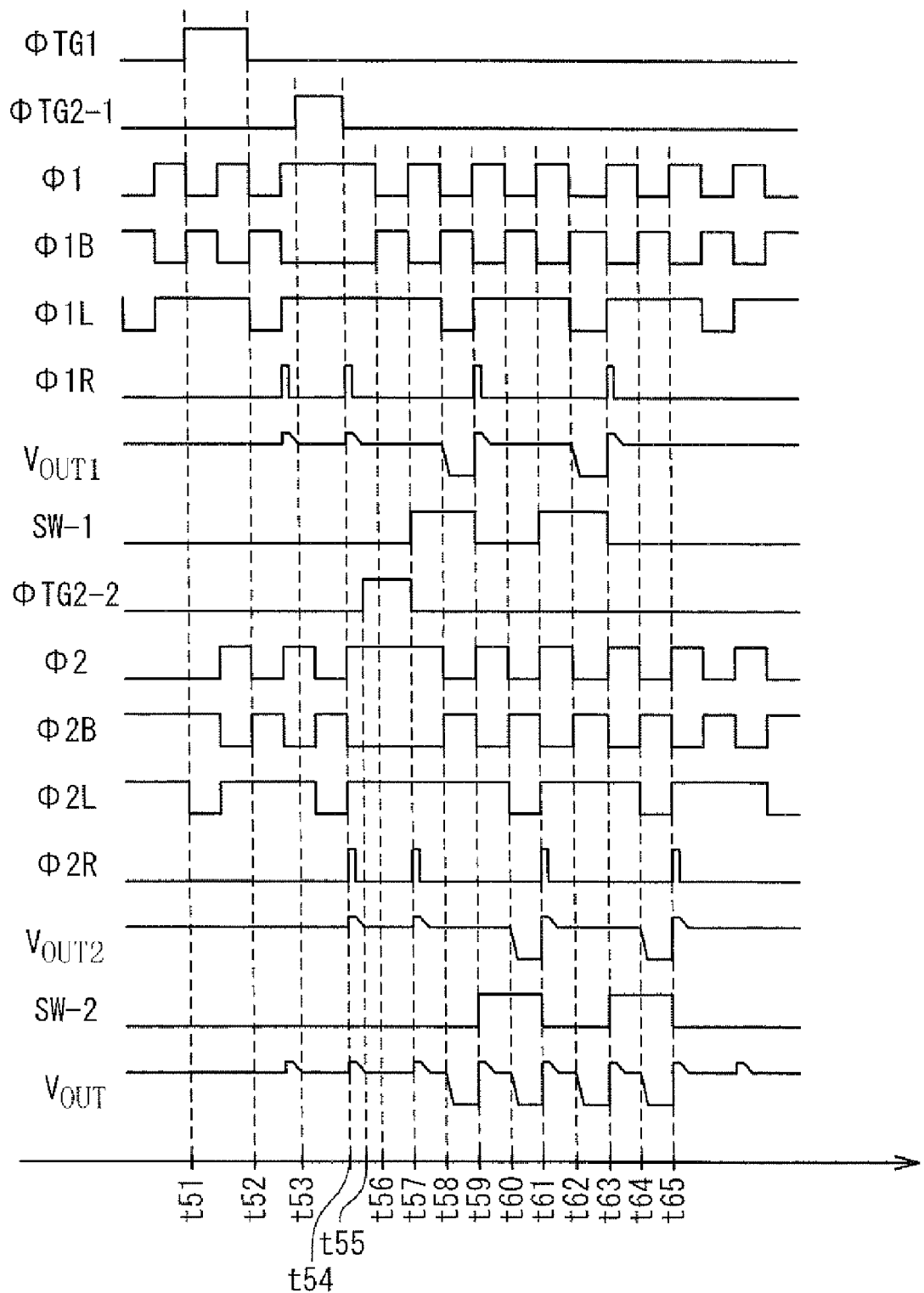
FIG. 9 is a timing chart showing an operation of the CCD image sensor array of the first embodiment.

Next, a description is given of the overall operation of the image sensor array of the present embodiment for the case when the image sensor array is placed in the two-pixel addition mode, with reference to FIG. 9. It should be noted that the resolution of the image sensor array is reduced down to one half of the original resolution thereof, when the image sensor array is operated in the two-pixel addition mode. It should be also noted that the operation of the image sensor array of the present embodiment in the normal operation mode is identical to that shown in FIG. 3, wherein the image sensor array is operated with the original resolution thereof.

When the photodiodes integrated within the first and second CCD image sensors CCD-1 and CCD-2 receive light for a certain period of time, the received light is photoelectrically converted by the PN junctions of the photodiodes, and accumulated as electric charges.

After the completion of the accumulation of the electric charges, the first transfer gate signal ΦTG1 supplied is switched to the high level at the time t51 to turn on the first transfer gate arrays 21 within both of the first and second CCD image sensors CCD-1 and CCD-2. In a period from the time t51 to the time t52, the electric charges accumulated across the photodiodes are transferred to the memory array 22 connected to the photodiodes. At the time t52, the timing generator circuit 3 pulls down the first transfer gate signal ΦTG1 to the low level and thereby turns off the first transfer gate array 21, thereby ending the charge transfer.

This is followed by pulling up the first CCD second transfer gate signal ΦTG2-1 to the high level at the time t53, and thereby transferring the electric charges stored in the memories are transferred to the CCD shift register 24 within the first CCD image sensor CCD-1. The second transfer gate array 23 of the first CCD image sensor CCD-1 is activated in response to the pull-up of the first CCD second transfer gate signal ΦTG2-1. The electric charges accumulated in the memory array 22 are transferred to the CCD shift register 24 through the second transfer gate array 23 within the first CCD image sensor CCD-1.

At this moment, as shown in FIG. 9, the timing generator circuit 3 previously sets the first CCD non-inverted clock Φ1 to the high level and sets the first CCD inverted clock Φ1B to the low level, so that the CCD shift register 24 of the first CCD image sensor CCD-1 receives the transferred electric charges. Thereafter, at the time t54, the timing generator circuit 3 pulls down the first CCD second transfer gate signal ΦTG2-1 to the low level to turn off the second transfer gate array 23 of the first CCD image sensor CCD-1.

At the time t55, the second CCD second transfer gate signal ΦTG2-2 is then pulled up to the high level to activate the second transfer gate set 23 of the second CCD image sensor CCD-2. In response to the pull-up of the second CCD second transfer gate signal ΦTG2-2, the second transfer gate array 23 transfers the electric charges stored in the memory array 22 to the CCD shift register 24 within the second CCD image sensor CCD-2. At this moment, the second CCD non-inverted clock Φ2 is previously set to the high level and the second CCD inverted clock Φ2B is previously set at the low level so that the electric charges can be received by the CCD shift register 24 of the second CCD image sensor CCD-2. Thereafter, the timing generator circuit 3 pulls down the second CCD second transfer gate signal ΦTG2-2 to the low level at the time t57 to turn off the second transfer gate array 23 within the second CCD image sensor CCD-2.

In the present embodiment, as shown in FIG. 9, the activation timing of the second CCD second transfer gate signal ΦTG2-2 fed to the second CCD image sensor CCD-2 is shifted from that of the first CCD second transfer gate signal ΦTG2-1 fed to the first CCD image sensor CCD-1 by one cycle period of the first and second CCD non-inverted clocks Φ1 and Φ2. In an alternative embodiment, the activation timing of the first CCD second transfer gate signal ΦTG2-1 fed to the first CCD image sensor CCD-1 may be same as that of the second CCD second transfer gate signal ΦTG2-2 fed to the second CCD image sensor CCD-2.

After the electric charges are transferred to the respective charge transfer elements 24A to 24D of the CCD shift register 24, the electric charges are transferred over the CCD shift register 24 with the electric charge signals of the first and second pixel photodiodes 20A and 20B added together at the last gate 25 within the first CCD image sensor CCD-1. Specifically, the first CCD last gate pulse Φ1L is previously set to the high level before the charge transfer to the CCD shift register 24. The first CCD non-inverted clock Φ1 is then switched from the high level, to the low level, again to the high level, and then to the low level, while the first CCD inverted clock Φ1B is switched from the low level, to the high level, again to the low level, and then to the high level.

At the time t56, the first CCD non-inverted clock Φ1 is switched from the high level to the low level to allow the electric charges of the first pixel photodiode 20A to be forwarded to the last gate 25 within the first CCD image sensor CCD-1.

At the time t57, the first CCD non-inverted clock Φ1 is switched from the low level to the high level. In the meantime, the first switch control signal SW-1 is pulled up to the high level so that the signal voltage $V_{OUT1}$ received from the first CCD image sensor CCD-1 is selected by the switch circuit 11. This allows externally outputting the field through level voltage (reference level voltage) and pixel signals from the first CCD image sensor CCD-1.

At the time t58, the first CCD non-inverted clock Φ1 is then switched from the high level to the low level for the second time to transfer the electric charges of the second pixel photodiode 20B to the last gate 25. This results in that the electric charges of first and second pixel photodiodes 20A and 20B are added together at the last gate 25.

This is followed by switching the first CCD last gate pulse Φ1L from the high level to the low level when the first non-inverted clock Φ1 is pulled down to the low level for the second time at the time 58. This allows the electric charges of the two pixels stored at the last gate 25 to be collectively transferred to the CFJ 27 within the first CCD image sensor CCD-1. The CFJ 27 converts the electric charges into a signal voltage and supplies the voltage signal to the amplifier 28. The amplifier 28 amplifies the supplied signal voltage to output the signal voltage $V_{OUT1}$. After the signal detection period of the first CCD image sensor CCD-1, the first CCD reset pulse Φ1R is pulled up to the high level at the time t59 to initialize the CFJ 27 for the preparation for the next signal accumulation.

This is followed by outputting the signal voltage $V_{OUT2}$ from the second CCD image sensor CCD-2 with the electric charge signals of the first and second pixel photodiodes 20A and 20B added together at the last gate 25 within the second CCD image sensor CCD-2. In order to avoid the signal voltage $V_{OUT2}$ overlapping the signal voltage $V_{OUT1}$ from the first CCD image sensor CCD-1 the activation timings of the second CCD non-inverted clock Φ2, the second CCD inverted clock Φ2B, the second CCD last gate pulse Φ2L, and the second CCD reset pulse Φ2R are shifted from those of the first CCD non-inverted clock Φ1, the first CCD inverted clock Φ1B, the first CCD last gate pulse Φ1L, and the first CCD reset pulse Φ1R by one clock period of the first CCD non-inverted clock Φ1. More specifically, the second CCD last gate pulse Φ2L is previously set at the high level before the time t58. The second CCD non-inverted clock Φ2 is then sequentially switched from the high level to the low level, again to the high level, and then to the low level, while the second CCD inverted clock Φ2B is switched from the low level to the high level, again to the low level, and further to the high level.

At the time t58, as shown in FIG. 9, the second CCD non-inverted clock Φ2 is switched from the high level to the low level to allow the electric charges of the first pixel photodiode 20A to be transferred to the last gate 25 within the second CCD image sensor CCD-2. Thereafter, at the time t60, the second CCD non-inverted clock Φ2 switched from the high level to the low level for the second time to transfer the electric charges of the second pixel photodiode 20B to the last gate 25 within the second CCD image sensor CCD-2. This results in the electric charges of the first and second pixel photodiodes 20A and 20B are added together at the last gate 25 within the second CCD image sensor CCD-2.

At the time t59, the second CCD non-inverted clock Φ2 is switched from the low level to the high level for the first time. In the meantime, the first switch control signal SW-2 is pulled up to the high level so that the signal voltage $V_{OUT2}$ received from the second CCD image sensor CCD-2 is selected by the switch circuit 11. This allows externally outputting the field through level voltage (reference level voltage) and pixel signals from the second CCD image sensor CCD-2.

At the time t60, the second CCD non-inverted clock Φ2 is pulled down to the low level for the second time, and the second CCD last gate pulse Φ2L is pulled down to the low level at the same time. This allows the electric charges of two pixels stored at the last gate 25 to be collectively transferred to the CFJ 27 within the second CCD image sensor CCD-2. The CFJ 27 converts the transferred electric charges into a signal voltage and supplies the signal voltage to the amplifier 28. The amplifier 28 amplifies the supplied signal voltage to output the signal voltage $V_{OUT2}$.

After the signal detection period of the second CCD image sensor CCD-2 is completed, the second CCD reset pulse Φ2R is pulled up to the high level to initialize the CFJ 27, and then the second CCD reset pulse Φ2R is pulled down to the low level in preparation for the next signal accumulation.

Similar operations are implemented again for outputting the pixel signals of the third and fourth pixel diodes 20C and 20D of the first and second CCD image sensors CCD-1 and CCD-2.

Specifically, the first CCD last gate pulse Φ1L is previously set at the high level before the time t60, and the first CCD non-inverted clock Φ1 is sequentially switched from the high level to the low level, again to the high level, and then to the low level, while the first CCD inverted clock Φ1B is switched from the low level to the high level, again to the low level, and then to the high level. When the first CCD non-inverted clock Φ1 is switched from the high level to the low level at the time t60, the electric charges of the third pixel photodiode 20C is transferred to the last gate 25 within the first CCD image sensor CCD-1. When the first CCD non-inverted clock Φ1 is then switched from the high level to the low level for the second time at the time t62, the electric charges of the fourth pixel photodiode 20D are transferred to the last gate 25 within the first CCD image sensor CCD-1. This allows the electric charges of the third and fourth pixel photodiodes 20C and 20D to be added together at the last gate 25 within the first CCD image sensor CCD-1.

In the meantime, the first switch control signal SW-1 is pulled up to the high level at the time t61, at which the first CCD non-inverted clock Φ1 is switched from the low level to the high level, so that the pixel signals of the first CCD image sensor CCD-1 are selected by the switch circuit 11. This allows outputting the field through level signal and pixel signals of the first CCD image sensor CCD-1.

When the first CCD non-inverted clock Φ1 is pulled down to the low level for the second time at the time t62, the first CCD last gate pulse Φ1L is switched to the low level to allow the electric charges of the third and fourth pixel photodiodes 20C and 20D stored in the last gate 25 to be collectively transferred to the CFJ 27 within the first CCD image sensor CCD-1. The CFJ 27 converts the electric charges received from the last gate 25 into a signal voltage, and the amplifier 28 amplify the signal voltage to output the signal voltage $V_{OUT1}$.

After the completion of the signal detection period of the first CCD image sensor CCD-1, the first CCD reset pulse Φ1R is pulled up to the high level to initialize the CFJ 27, and then the first CCD reset pulse Φ1R is pulled down to the low level in preparation for the next signal accumulation.

This is followed by generating the signal voltage $V_{OUT2}$ with the electric charges of the third and fourth pixel photodiodes 20C and 20D added together within the second CCD image sensor CCD-2. In order to avoid the signal voltage $V_{OUT2}$ overlapping the signal voltage $V_{OUT1}$ received from the first CCD image sensor CCD-1, the activation timings of the second CCD non-inverted clock Φ2, the second CCD inverted clock Φ2B, the second CCD last gate pulse Φ2L, and the second CCD reset pulse Φ2R are shifted from the first CCD non-inverted clock Φ1, the first CCD inverted clock Φ1B, the first CCD last gate pulse Φ1L, and the first CCD reset pulse Φ1R by one clock cycle of the first CCD non-inverted clock Φ1.

Similar operations to those for the third and fourth pixel photodiodes 20C and 20D of the first CCD image sensor CCD-1 are then implemented for the second CCD image sensor CCD-2, whereby the electric charges of the third and fourth pixel photodiodes 20C and 20D transferred to the CCD shift registers 24 are added together at the last gate 25. In the second CCD image sensor CCD-2, the electric charges of third and fourth pixel photodiodes 20C and 20D stored at the last gate 25 are collectively transfers to the CFJ 27. The CFJ 27 converts the electric charges transferred thereto into a voltage signal, and the amplifier 28 amplified the voltage signal to output the signal voltage $V_{OUT2}$. After the completion of the signal detection period of the second CCD image sensor CCD-2, the CFJ 27 is initialized in preparation for the next signal accumulation.

As a result of performing the operation described above, the signal voltage generated by the first CCD image sensor CCD-1 corresponding to the electric charges of the first and second pixel photodiodes 20A and 20B added together is outputted first from the output of the switch circuit 11, and then the signal voltage generated by the second CCD image sensor CCD-2 corresponding to the electric charges of the first and second pixel photodiodes 20A and 20B added together is outputted. This is followed by outputting the signal voltage generated by the first CCD image sensor CCD-1 corresponding to the electric charges of the third and fourth pixel photodiodes 20C and 20D added together, and then outputting the signal voltage generated by the second CCD image sensor CCD-2 corresponding to the electric charges of the third and fourth pixel photodiodes 20C and 20D added together. The time period required for outputting the signal voltages is half of that conventionally required. Therefore, the time period required for reading the pixel signals from the image sensor array can be reduced by half by forming the image sensor unit 10 of the present embodiment and then performing the operation described above.

Second Embodiment

Hereinafter, a description is then given of an image sensor array of a second embodiment of the present invention. In the second embodiment, an image sensor array is provided with four CCD image sensors and is designed to be adapted to four-pixel addition mode (which results in the reduction of the resolution down to one quarter of the original resolution).

Figure 10:
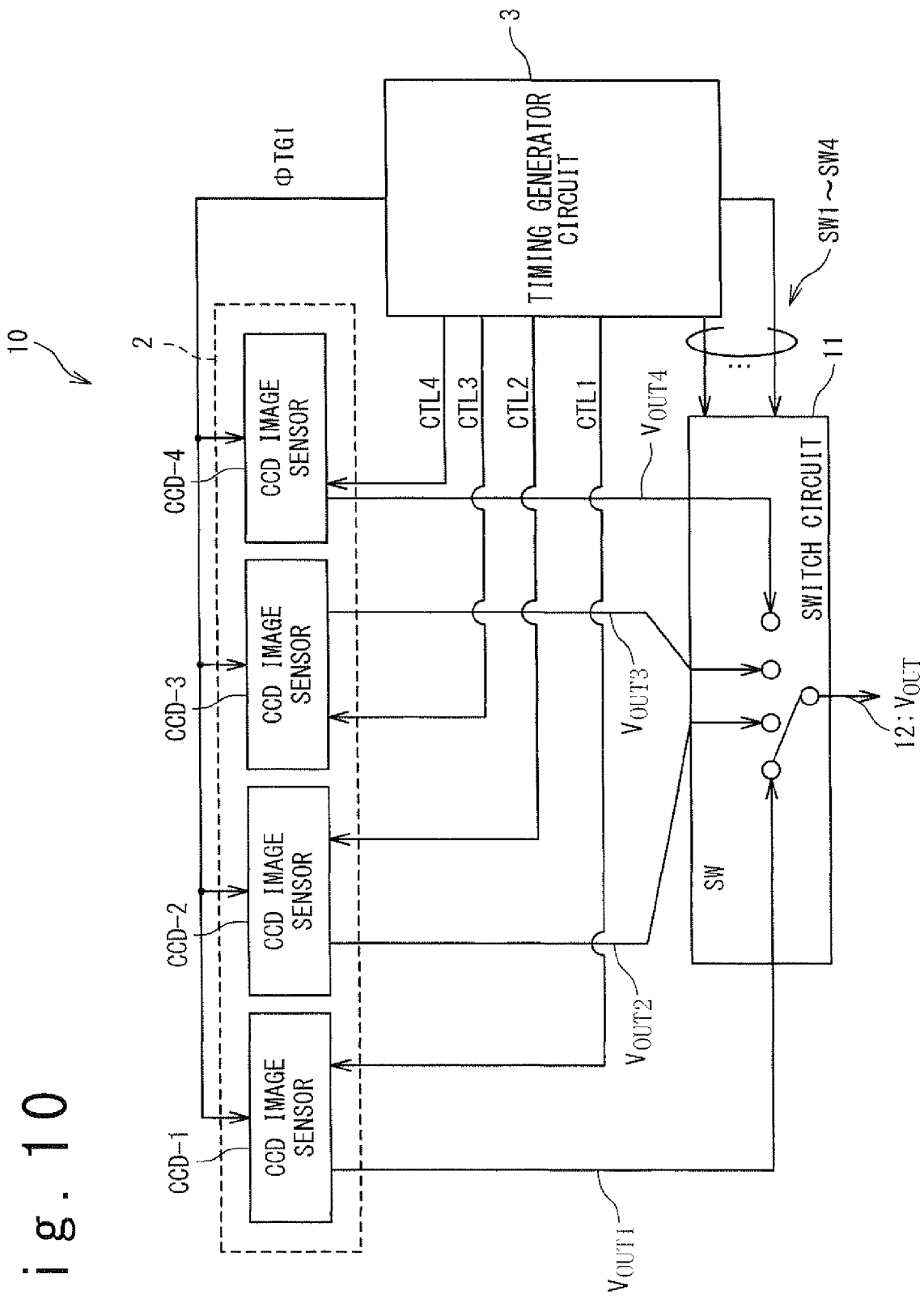
FIG. 10 is a block diagram illustrating the configuration of a CCD image sensor array of a second embodiment.

FIG. 10 is a block diagram showing an exemplary configuration of an image sensor unit 10 of the second embodiment. The image sensor unit 10 is provided with a CCD (Charge Couple Device) image sensor array 2, a timing generator circuit 3, and a switch circuit 11. In the second embodiment, the CCD (Charge Couple Device) image sensor array 2 of the image sensor unit 10 includes first to fourth CCD image sensors CCD-1, CCD-2, CCD-3, and CCD-4. The first to fourth CCD image sensors CCD-1, CCD-2, CCD-3 and CCD-4 are structured similarly to that of the CCD image sensor shown in FIG. 6, except for that a different number of photodiodes, memories, and shift registers are integrated therein; the first to fourth CCD image sensors CCD-1, CCD-2, CCD-3, and CCD-4 are each provided with eight photodiodes, eight memories, and eight charge transfer elements.

The first to fourth CCD image sensors CCD-1 to CCD-4 are commonly connected to the timing generator circuit 3 and also commonly connected to the switch circuit 11. The switch circuit 11 has a function of selecting signal voltages received from the first to fourth CCD image sensors CCD-1 to CCD-4 in response to first to fourth switch control signals SW-1, SW-2, SW-3, and SW-4 supplied from the timing generator circuit 3.

The timing generator circuit 3 provides timing controls of the first to fourth CCD image sensors CCD-1 to CCD-4. Specifically, a first transfer gate signal ΦTG1 is commonly fed to the first to fourth CCD image sensors CCD-1 to CCD-4 from the timing generator circuit 3. In addition, the timing generator circuit 3 feeds first control signals CTL1 to the first CCD image sensor CCD-1, and second control signals CTL2 to the second CCD image sensor CCD-2. Furthermore, the timing generator circuit 3 feeds third control signals CTL3 to the third CCD image sensor CCD-3, and also feeds fourth control signals CTL4 to fourth second CCD image sensor CCD-4.

In the second embodiment, the first control signals CTL1 includes a first CCD second transfer gate signal ΦTG2-1, a first CCD non-inverted clock Φ1, a first CCD inverted clock Φ1B, a first CCD last gate pulse Φ1L, and a first CCD reset pulse Φ1R, and the second control signals CTL2 includes a second CCD second transfer gate signal ΦTG2-2, a second CCD non-inverted clock Φ2, a second CCD inverted clock Φ2B, a second CCD last gate pulse Φ2L, and a second CCD reset pulse Φ2R. Correspondingly, the third control signals CTL3 includes a third CCD second transfer gate signal ΦTG2-3, a third CCD non-inverted clock Φ3, a third CCD inverted clock Φ3B, a third CCD last gate pulse Φ3L, and a third CCD reset pulse Φ3R. The fourth control signals CTL4 includes a fourth CCD second transfer gate signal ΦTG2-4, a fourth CCD non-inverted clock Φ4, a fourth CCD inverted clock Φ4B, a fourth CCD last gate pulse Φ4L, and a fourth CCD reset pulse Φ4R.

The operation of the image sensor array of the second embodiment is similar to that of the first embodiment.

Figure 11:
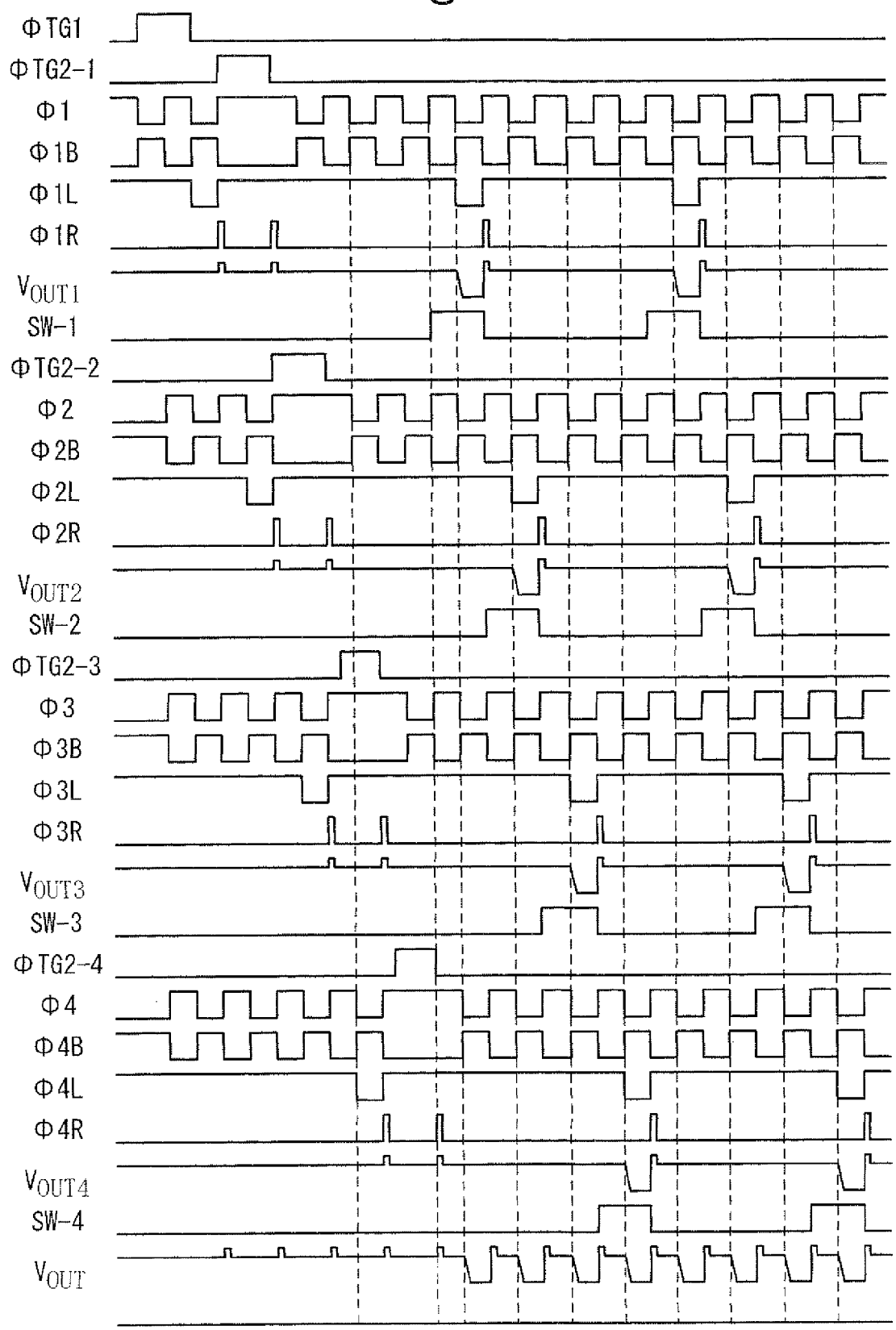
FIG. 11 is a timing chart illustrating the operation of the CCD image sensor array of the second embodiment.

FIG. 11 is a timing chart illustrating the operation of the image sensor array in the second embodiment. In the second embodiment, electric charges of a series of four pixel photodiodes are added together in the first to fourth CCD image sensors CCD-1 to CCD-4, respectively, and the signal voltages are generated from the electric charges added together in the first to fourth CCD image sensors CCD-1 to CCD-4. In order to achieve this, cycle periods of the first CCD last gate pulse Φ1L, the second CCD last gate pulse Φ2L, the third CCD last gate pulse Φ3L, the fourth CCD last gate pulse Φ4L, the first CCD reset pulse Φ1R, the second CCD reset pulse Φ2R, the third CCD reset pulse Φ3R, and the fourth CCD reset pulse Φ4R are reduced down to one quarter of those for the normal operation mode. In order to sequentially output the signal voltages, the timing generator circuit 3 sequentially pulls up the first, second, third, and fourth switch control signals SW-1, SW-2, SW-3, and SW-4.

More specifically, after the first to fourth CCD image sensors CCD-1 to CCD-4 are allowed to receive light for a certain period of time, the first transfer gate signal ΦTG1 is pulled up to the high level, and the first transfer gate arrays 21 integrated within the first to fourth CCD image sensors CCD-1 to CCD-4 are activated in response to the pull-up of the first transfer gate signal ΦTG1. This allows the electric charges accumulated across the pixel photodiodes are transferred to memories integrated with in the first to fourth CCD image sensors CCD-1 to CCD-4 through the first transfer gate arrays 21. After the completion of the charge transfer, the first transfer gate signal ΦTG1 is pulled down to the low level to deactivate the first transfer gate arrays 21.

First, the electric charges stored in the memories are transferred to the CCD shift register 24 in the first CCD image sensor CCD-1. More specifically, the first CCD second transfer gate signal ΦTG2-1 is pulled up to the high level to turn on the second transfer gate array 23 within the first CCD image sensor CCD-1. This allows transferring the electric charges from the memories to the CCD shift register 24 within the first CCD image sensor CCD-1. After the charge transfer to the CCD shift register is completed, the first CCD second transfer gate signal ΦTG2-1 is pulled down to the low level to turn off the second transfer gate array 23.

This is followed by repeatedly switching the first CCD non-inverted clock Φ1 and the first CCD inverted clock Φ1B from the high level to the low level three times with the first CCD last gate pulse Φ1L kept at the high level, to store the electric charges of the leading three pixel photodiodes of the first CCD image sensor CCD-1 at the last gate 25 of the first CCD image sensor CCD-1. At the fourth switching of the first CCD non-inverted clock Φ1 from the high level to the low level, electric charges of the fourth pixel photodiodes are transferred from the CCD shift register 24 to the last gate 25 within the first CCD image sensor CCD-1. Simultaneously, the first CCD last gate pulse Φ1L is switched from the high level to the low level. This allows transferring the electric charges of the four pixel photodiodes accumulated at the last gate 25 to the CFJ 27. A signal voltage $V_{OUT1}$ is then generated by the first CCD image sensor CCD-1 so as to correspond the electric charges of the leading four pixel photodiodes added together. In the meantime, the first switch control signal SW-1 is pulled up to the high level so that the signal voltage $V_{OUT1}$, which is generated by the first CCD image sensor CCD-1, is outputted from the output terminal of the switch circuit 11.

Next, the electric charges stored in the memories are transferred to the CCD shift register 24 in the second CCD image sensor CCD-2. More specifically, the second CCD second transfer gate signal ΦTG2-2 is pulled up to the high level to turn on the second transfer gate array 23 within the second CCD image sensor CCD-2. This allows transferring the electric charges from the memories to the CCD shift register 24 within the second CCD image sensor CCD-2. After the charge transfer to the CCD shift register is completed, the second CCD second transfer gate signal ΦTG2-2 is pulled down to the low level to turn off the second transfer gate array 23.

This is followed by repeatedly switching the second CCD non-inverted clock Φ2 and the second CCD inverted clock Φ2B from the high level to the low level three times with the second CCD last gate pulse Φ2L kept at the high level, to store the electric charges of the leading three pixel photodiodes of the second CCD image sensor CCD-2 at the last gate 25 of the second CCD image sensor CCD-2. At the fourth switching of the first CCD non-inverted clock Φ2 from the high level to the low level, electric charges of the fourth pixel photodiodes are transferred from the CCD shift register 24 to the last gate 25 within the second CCD image sensor CCD-2. Simultaneously, the second CCD last gate pulse Φ2L is switched from the high level to the low level. This allows transferring the electric charges of the four pixel photodiodes accumulated at the last gate 25 to the CFJ 27. A signal voltage $V_{OUT2}$ is then generated by the second CCD image sensor CCD-2 so as to correspond the electric charges of the leading four pixel photodiodes added together. In the meantime, the second switch control signal SW-2 is pulled up to the high level so that the signal voltage $V_{OUT2}$, which is generated by the second CCD image sensor CCD-2, is outputted from the output terminal of the switch circuit 11.

Next, the electric charges stored in the memories are transferred to the CCD shift register 24 in the third CCD image sensor CCD-3. More specifically, the third CCD second transfer gate signal ΦTG2-3 is pulled up to the high level to turn on the second transfer gate array 23 within the third CCD image sensor CCD-3. This allows transferring the electric charges from the memories to the CCD shift register 24 within the third CCD image sensor CCD-3. After the charge transfer to the CCD shift register is completed, the third CCD second transfer gate signal ΦTG2-3 is pulled down to the low level to turn off the second transfer gate array 23.

This is followed by repeatedly switching the third CCD non-inverted clock Φ3 and the third CCD inverted clock Φ3B from the high level to the low level three times with the third CCD last gate pulse Φ3L kept at the high level, to store the electric charges of the leading three pixel photodiodes of the third CCD image sensor CCD-3 at the last gate 25 of the third CCD image sensor CCD-3. At the fourth switching of the third CCD non-inverted clock Φ3 from the high level to the low level, electric charges of the fourth pixel photodiodes are transferred from the CCD shift register 24 to the last gate 25 within the third CCD image sensor CCD-3. Simultaneously, the third CCD last gate pulse Φ3L is switched from the high level to the low level. This allows transferring the electric charges of the four pixel photodiodes accumulated at the last gate 25 to the CFJ 27. A signal voltage $V_{OUT3}$ is then generated by the third CCD image sensor CCD-3 so as to correspond the electric charges of the leading four pixel photodiodes added together. In the meantime, the third switch control signal SW-3 is pulled up to the high level so that the signal voltage $V_{OUT3}$, which is generated by the third CCD image sensor CCD-3, is outputted from the output terminal of the switch circuit 11.

Next, the electric charges stored in the memories are transferred to the CCD shift register 24 in the fourth CCD image sensor CCD-4. More specifically, the fourth CCD second transfer gate signal ΦTG2-4 is pulled up to the high level to turn on the second transfer gate array 23 within the fourth CCD image sensor CCD-4. This allows transferring the electric charges from the memories to the CCD shift register 24 within the fourth CCD image sensor CCD-4. After the charge transfer to the CCD shift register is completed, the fourth CCD second transfer gate signal ΦTG2-4 is pulled down to the low level to turn off the second transfer gate array 23.

This is followed by repeatedly switching the fourth CCD non-inverted clock Φ4 and the fourth CCD inverted clock Φ4B from the high level to the low level three times with the fourth CCD last gate pulse Φ4L kept at the high level, to store the electric charges of the leading three pixel photodiodes of the fourth CCD image sensor CCD-4 at the last gate 25 of the fourth CCD image sensor CCD-4. At the fourth switching of the fourth CCD non-inverted clock Φ4 from the high level to the low level, electric charges of the fourth pixel photodiodes are transferred from the CCD shift register 24 to the last gate 25 within the fourth CCD image sensor CCD-4. Simultaneously, the fourth CCD last gate pulse Φ4L is switched from the high level to the low level. This allows transferring the electric charges of the four pixel photodiodes accumulated at the last gate 25 to the CFJ 27. A signal voltage $V_{OUT4}$ is then generated by the fourth CCD image sensor CCD-4 so as to correspond the electric charges of the leading four pixel photodiodes added together. In the meantime, the fourth switch control signal SW-4 is pulled up to the high level so that the signal voltage $V_{OUT4}$, which is generated by the fourth CCD image sensor CCD-4, is outputted from the output terminal of the switch circuit 11.

The above-described operation is repeated once again, since each CCD image sensor incorporates eight photodiodes. More specifically, the operation of generating the signal voltages $V_{OUT1}$ to $V_{OUT4}$ corresponding to the electric charges of four pixel photodiodes added together within the first to fourth CCD image sensors CCD-1 to CCD-4 is repeated twice, and the first to fourth CCD image sensors CCD-1 to CCD-4 are sequentially selected twice in response to the first to fourth switch control signal SW-1, SW-2, SW-3, and SW-4.

The image sensor array in the second embodiment, which incorporates four CCD image sensors connected together, can be operated most efficiently with the speed reduced down to one fourth of that in the normal operation speed, when the signal voltage $V_{OUT1}$ to $V_{OUT4}$ are generated from electric charges of four pixel photodiodes added together, that is, when the resolution is reduced down to one quarter of the original resolution.

Alternatively, the operation may be modified to provide the resolution reduction down to one half of the original resolution in this embodiment. In this case, the signal voltages $V_{OUT1}$ and $V_{OUT2}$ of the first and second CCD image sensors CCD-1 and CCD-2 are first outputted from the switch circuit 11, and the signal voltages $V_{OUT3}$ and $V_{OUT4}$ of the third and fourth CCD image sensors CCD-3 and CCD-4 are then outputted from the switch circuit 11. In other words, the same operations as that of the first embodiment are implemented twice for each of the set of the first and second CCD image sensors CCD-1 and CCD-2 and the set of the third and fourth CCD image sensors CCD-3 and CCD-4.

It is apparent that the present invention is not limited to the above embodiments, but may be modified and changed without departing from the scope of the invention.

It should be especially noted that the number of CCD image sensors connected together is not limited to two or four as described above; the number of CCD image sensors may be three, six, eight, or other numbers. Moreover, when the number of pixels of the photodiodes is increased, it is preferable to increase the number of applied clock pulses accordingly.

It should be also noted that the number of pixel photodiodes within each CCD image sensor is not limited to four or eight. Image sensor arrays currently commercially available usually incorporate approximately 10300 photodiodes for reading a sheet of A4 paper (with a short side sized approximately 21 cm) in total, when the resolution is 1200 DPI (dots per inch). This may be achieved by integrating 800 to 1600 photodiodes within each CCD image sensor with six to twelve CCD image sensors within an image sensor array.

What is claimed is:

1. An image sensor array comprising:
a first CCD image sensor configured to output a plurality of first signal voltages from a first output terminal;
a second CCD image sensor configured to output a plurality of second signal voltages from a second output terminal;
a switch circuit selectively connecting one of said first and second output terminals to a signal voltage output terminal; and
a timing generator circuit responsive to a basic clock for generating first and second control signals and switch control signals, said first and second control signals being used for controlling generation of said plurality of first and second signal voltages, respectively, and said switch control signals being used for controlling said switch circuit,
wherein said timing generator circuit controls said first and second CCD image sensors so that said first and second CCD image sensors output said plurality of first signal voltages and said plurality of second signal voltages, alternately,
wherein said timing generator circuit controls said switch circuit so that said switch circuit outputs from said signal voltage output terminal one of said plurality of first signal voltages and one of said plurality of second signal voltages, alternately,
wherein said timing generator circuit further controls said first and second CCD image sensors and said switch circuit, so that said plurality of first signal voltages are successively outputted from said signal voltage output terminal and then said plurality of second signal voltages are successively outputted from said signal voltage output terminal, and
wherein said image sensor array is adapted to selectively output signal voltages for an original resolution of said image sensor array and signal voltages for a resolution of one half of said original resolution.

2. The image sensor array according to claim 1, wherein said timing generator circuit generates said first and second control signals so that activation timings of said second control signal is shifted from those of said first control signal by one clock cycle of said basic clock.

3. The image sensor array according to claim 1, wherein said switch control signals include first and second switch signals, and
wherein said switch circuit connects said first output terminal to said signal voltage terminal in response to said first switch signal, and connects said second output terminal to said signal voltage terminal in response to said second switch signal.

4. The image sensor array according to claim 3, wherein said timing generator circuit generates said first and second switch signals so that an activation timing of said second switch signal is shifted from that of said first switch signal by one clock cycle of said basic clock.

5. An image sensor array comprising:
a first CCD image sensor configured to output a plurality of first signal voltages from a first output terminal;
a second CCD image sensor configured to output a plurality of second signal voltages from a second output terminal;
a third CCD image sensor configured to output a plurality of third signal voltages from a third output terminal;
a fourth CCD image sensor configured to output a plurality of fourth signal voltages from a fourth output terminal;
a switch circuit selectively connecting one of said first and second output terminals to a signal voltage output terminal; and
a timing generator circuit responsive to a basic clock for generating first and second control signals and switch control signals, said first and second control signals being used for controlling generation of said plurality of first and second signal voltages, respectively, and said switch control signals being used for controlling said switch circuit,
wherein said timing generator circuit controls said first and second CCD image sensors so that said first and second CCD image sensors output said plurality of first signal voltages and said plurality of second signal voltages, alternately,
wherein said timing generator circuit controls said switch circuit so that said switch circuit outputs from said signal voltage output terminal one of said plurality of first signal voltages and one of said plurality of second signal voltages, alternately,
wherein said switch circuit selectively connecting one of said first to fourth output terminals to said signal voltage output terminal,
wherein said timing generator circuit is responsive to said basic clock for further generating third and fourth control signals, said third and fourth control signals being used for controlling generation of said plurality of third and fourth signal voltages, respectively,
wherein said timing generator circuit controls said first to fourth CCD image sensors so that said first to fourth CCD image sensors sequentially output said plurality of first to fourth signal voltages, wherein said timing generator circuit controls said switch circuit so that said switch circuit sequentially outputs from said signal voltage output terminal said plurality of first to fourth signal voltages, and wherein said timing generator circuit generates said first to fourth control signals so that activation timings of said third control signal is shifted from those of said second control signal by one clock cycle of said basic clock, and so that activation timings of said fourth control signal is shifted from those of said third control signal by one clock cycle of said basic clock.

6. The image sensor array according to claim 5, wherein said switch control signals further include third and fourth switch signals, and wherein said switch circuit connects said third output terminal to said signal voltage terminal in response to said third switch signal, and connects said fourth output terminal to said signal voltage terminal in response to said fourth switch signal.

7. The image sensor array according to claim 6, wherein said timing generator circuit generates said third and fourth switch signals so that an activation timing of said third switch signal is shifted from that of said second switch signal by one clock cycle of said basic clock, and so that an activation timing of said fourth switch signal is shifted from that of said fourth switch signal by one clock cycle of said basic clock.

8. The image sensor array according to claim 5, wherein said timing generator circuit further controls said first to fourth CCD image sensors and said switch circuit, so that said plurality of first signal voltages are successively outputted from said signal voltage output terminal, said plurality of second signal voltages are then successively outputted from said signal voltage output terminal, said plurality of third signal voltages are then successively outputted from said signal voltage output terminal, and then said plurality of fourth signal voltages are successively outputted from said signal voltage output terminal.

9. The image sensor array according to claim 8, wherein said image sensor array is adapted to selectively output signal voltages for an original resolution of said image sensor array and signal voltages for a resolution of one half of said original resolution.

10. An image sensor array comprising:
first to n-th CCD image sensors configured to output a plurality of first to n-th signal voltages from first to n-th output terminals, respectively, n being an integer equal to or more than two;
a switch circuit selectively connecting one of said first to n-th output terminals to a signal voltage output terminal; and
a timing generator circuit responsive to a basic clock for generating first to n-th control signals and switch control signals, said first to n-th control signals being used for controlling generation of said plurality of first and n-th signal voltages, respectively, and said switch control signals being used for controlling said switch circuit, wherein said timing generator circuit controls said first to n-th CCD image sensors so that said first to n-th CCD image sensors sequentially output respective one of said plurality of first to n-th signal voltages, wherein said timing generator circuit controls said switch circuit so that said switch circuit outputs from said signal voltage output terminal said respective one of said plurality of first to n-th signal voltages, wherein said timing generator circuit further controls said first to n-th CCD image sensors and said switch circuit, so that said plurality of first to n-th signal voltages are successively and sequentially outputted from said signal voltage output terminal, and wherein said image sensor array is adapted to selectively output signal voltages for an original resolution of said image sensor array and signal voltages for a resolution of one half of said original resolution.

11. The image sensor array according to claim 10, wherein said timing generator circuit generates said first to n-th control signals so that activation timings of said (m+1)-th control signal is shifted from those of said m-th control signal by one clock cycle of said basic clock, m being an integer from one to n.

12. The image sensor array according to claim 10, wherein said switch control signals include first to n-th switch signals, and wherein said switch circuit connects one of said first to n-th output terminals to said signal voltage terminal in response to said first to n-th switch signals.

13. The image sensor array according to claim 12, wherein said timing generator circuit generates said first to n-th switch signals so that an activation timing of said (m+1)-th switch signal is shifted from that of said m-th switch signal by one clock cycle of said basic clock, m being an integer from one to n.

* * * * *